United States Patent [19]

Iizuka

[11] Patent Number: 5,069,085
[45] Date of Patent: Dec. 3, 1991

[54] SHIFT CONTROL SYSTEM FOR AUTOMATIC POWER TRANSMISSION WITH ENHANCED SHIFTING TRANSITION CHARACTERISTICS

[75] Inventor: Naonori Iizuka, Shizuoka, Japan
[73] Assignee: Jatco Corporation, Shizuoka, Japan
[21] Appl. No.: 480,717
[22] Filed: Feb. 15, 1990
[51] Int. Cl.$^5$ ............... F16H 59/44; F16H 59/24
[52] U.S. Cl. ...................... 74/866; 364/424.1
[58] Field of Search ............ 364/424.1; 74/866

[56] References Cited

U.S. PATENT DOCUMENTS

| | | | |
|---|---|---|---|
| 3,640,156 | 2/1972 | Mori et al. | 74/866 |
| 3,776,048 | 12/1973 | Enomoto et al. | 74/866 |
| 4,103,764 | 8/1978 | Iijima | 74/866 X |
| 4,486,838 | 12/1984 | Itoh et al. | 74/866 X |
| 4,614,258 | 9/1986 | Fukunaga | 192/0.052 |
| 4,680,992 | 7/1987 | Hayasaki et al. | 74/869 |
| 4,733,580 | 3/1988 | Kubo et al. | 74/866 |
| 4,765,201 | 8/1988 | Ishiguro et al. | 74/866 |
| 4,829,435 | 5/1989 | Isono | 364/424.1 |
| 4,841,447 | 6/1989 | Hayahi et al. | 364/424.1 X |
| 4,889,015 | 12/1989 | Kondo | 74/866 |
| 4,891,759 | 1/1990 | Kato | 74/866 X |
| 4,942,530 | 7/1990 | Boda et al. | 74/866 X |
| 4,955,257 | 9/1990 | Terayama et al. | 74/866 |
| 4,982,623 | 1/1991 | Yoshino et al. | 74/866 |

FOREIGN PATENT DOCUMENTS

| | | |
|---|---|---|
| 1954757 | 7/1970 | Fed. Rep. of Germany . |
| 2165707 | 8/1972 | Fed. Rep. of Germany . |
| 3427809 | 2/1985 | Fed. Rep. of Germany . |

*Primary Examiner*—Allan D. Herrmann
*Assistant Examiner*—Khoi Q. Ta
*Attorney, Agent, or Firm*—Ronald P. Kananen

[57] ABSTRACT

A shift control system is provided with first and second down shifting criteria. The first down shifting criterion is set at a higher vehicle speed than that of the second down shifting criterion so that actual down shifting operations take place at a higher vehicle speed for the first criterion than for the second down shifting criterion. The shift control system is responsive to a manually entered down shift command for selecting the first down shifting criterion and maintaining the first down shifting criterion for a predetermined period of time, and subsequently selecting the second down shifting criterion after expiration of the predetermined time period.

5 Claims, 7 Drawing Sheets

FIG. 2

| | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|
| D RANGE 1ST. SPEED | | | O | | | | O | O | $\frac{1+\alpha_2}{\alpha_2}$ | 3.027 |
| D RANGE 2ND. SPEED | | O | O | | O | | O | | $\frac{\alpha_1+\alpha_2+\alpha_1\alpha_2}{\alpha_2(1+\alpha_1)}$ | 1.619 |
| D RANGE 3RD. SPEED | | O | O | O | | | O | | 1 | 1.000 |
| D RANGE 4TH. SPEED | | | (O) | O | O | | | | $\frac{1}{1+\alpha_1}$ | 0.694 |
| ENGINE BRAKING STATE 1ST. SPEED | | | (O) | O | | O | (O) | (O) | | |
| ENGINE BRAKING STATE 2ND. SPEED | | O | (O) | | O | | (O) | | | |
| ENGINE BRAKING STATE 3RD. SPEED | | O | (O) | | O | | (O) | | | |
| ENGINE BRAKING STATE 4TH. SPEED | | | (O) | | O | | | | | |
| REVERSE | O | | | | | O | | | $-\frac{1}{\alpha_1}$ | −2.272 |

( ) IRRELATIVE FOR POWER (O) IRRELATIVE FOR POWER

SHIFT CONTROL SYSTEM FOR AUTOMATIC POWER TRANSMISSION WITH ENHANCED SHIFTING TRANSITION CHARACTERISTICS

BACKGROUND OF THE INVENTION

1. Field of the Invention

The present invention relates generally to a shift control system for an automatic power transmission for an automotive vehicle. More specifically, the invention relates to an automatic power transmission which provides variable shifting criteria for enhanced shifting transition characteristics when varying the transmission speed ratio, particularly in down-shifting of the transmission.

2. Description of the Background Art

Japanese Patent First (unexamined) Publication (Tokkai) Showa 60-139960 discloses a shift control system for an automatic power transmission. The disclosed shift control system is provided with a capability for down-shifting the speed ratio of a transmission at engine revolution speeds lower than or equal to a predetermined down-shifting criterion. Providing such a down-shifting limitation in relation to the engine revolution speed successfully prevents the engine from overrunning. On the other hand, such limitation may cause a lag time from entry of a down shift command to the actual occurrence of the down-shifting of the speed ratio. For example, assuming that a vehicle is being driven, the transmission in the D range therefore, at a speed far higher than the down-shifting criterion, the speed ratio of the automatic power transmission will be maintained at its current speed ratio until the engine revolution speed drops across the down-shift criterion by an engine braking effect at the current speed ratio and, subsequently is shifted to a demanded lower speed ratio, at which a greater magnitude of engine braking effect is provided. Therefore, the actual transmission speed down-shift timing cannot correspond to a driver's will due to a substantial lag time. This clearly degrades the 'feel' of driving with an automatic power transmission.

Of course, one approach for providing a better shift feeling is to provide a shift control system which will instantly perform down-shifting of the transmission gear ratio upon entry of a down-shift command; however, in such case, every time down-shifting occurs at high vehicle speed, the engine revolution speed is increased and creates substantial engine noise. Furthermore, rapid increase in the engine revolution speed may cause degradation of a vehicle's driving stability.

SUMMARY OF THE INVENTION

Therefore, it is an object of the present invention to provide a shift control system for an automatic power transmission which can solve the aforementioned drawback in conventional shift control systems.

Another object of the invention is to provide a shift control system which can achieve satisfactorily high response characteristics in demand for shifting without causing degradation of passenger comfort and/or driving stability.

In order to accomplish the aforementioned and other objects, a shift control system, according to the present invention, is provided with first and second down shifting criteria. The first down shifting criterion is set at a higher vehicle speed than that of the second down shifting criterion so that down shifting operations in the first criterion take place at higher vehicle speeds than that in the second down shifting criterion. The shift control system is responsive to manually entered down shift commands for selecting the first down shifting criterion and maintaining same for a predetermined period of time, and subsequently selecting the second down shifting criterion after expiration of the predetermined time period.

According to one aspect of the invention, a shift control system for an automotive automatic power transmission which includes shifting means for establishing a plurality of speed ratios and a manual selector for manually selecting one of a plurality of operational ranges, comprises: operational ranges, comprises:

first means for detecting a down-shift command entered through the manual selector for generating a down-shift command indicative signal;

second means for providing vehicle speed representative data;

third means, comparing first and second down-shifting criteria with the vehicle speed representative data for detecting an optimum shift timing to operate the shifting means for establishing a speed ratio corresponding to the down-shift command when vehicle speed drops across a speed threshold predetermined for each of the first or second down-shifting criteria, the first down-shifting criterion being set at a value corresponding to a higher vehicle speed than that of the second down-shifting criterion, the third means detecting vehicle driving conditions for selecting the first down-shifting criterion and maintaining the first down-shifting criterion for a predetermined period of time and subsequently selecting the second down-shifting criterion after expiration of the predetermined time period.

Preferably, the first down-shifting criterion is set at a vehicle speed at which the engine braking effect caused by down-shifting, which accelerates engine revolution speed, is held within an allowable engine revolution maximum speed. In addition, the first and second down-shifting criteria are set with respect to a selected operational range of the automatic power transmission.

The third means is responsive to the down-shift command indicative signal for selecting the first down-shifting criterion whenever the down-shift command indicative signal is detected. Additionally, the shift control system may further comprise fourth means for monitoring engine load for providing engine load indicative data, wherein the third means is responsive to the down-shift command indicative signal for selecting the first down-shifting criterion when engine load indicative data is below a predetermined engine load threshold value.

According to another aspect of the invention, a shift control system for an automotive automatic power transmission which includes shifting means for establishing a plurality of speed ratios and a manual selector for manually selecting one of a plurality of operational ranges, comprises:

first means for detecting a down-shift command entered through the manual selector for generating a down-shift command indicative signal;

second means for providing vehicle speed representative data;

third means, comparing first and second down-shifting criteria with the vehicle speed representative data for detecting an optimum shift timing to operate the shifting means for establishing a speed ratio corresponding to the down-shift command when vehicle speed drops across a speed threshold predetermined for each of the first or second down-shifting criteria, the first down-shifting criterion being set at a value corresponding to a higher vehicle speed than that of the second down-shifting criterion, the third means being responsive to the down-shift command indicative signal for selecting the first down-shifting criterion and maintaining the first down-shifting criterion for a predetermined period of time and subsequently selecting the second down-shifting criterion after expiration of the predetermined time period.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 2 is a chart showing active components of the power transmission of FIG. 1, which are active at respective operational ranges;

DESCRIPTION OF THE PREFERRED EMBODIMENT

Figure 1:
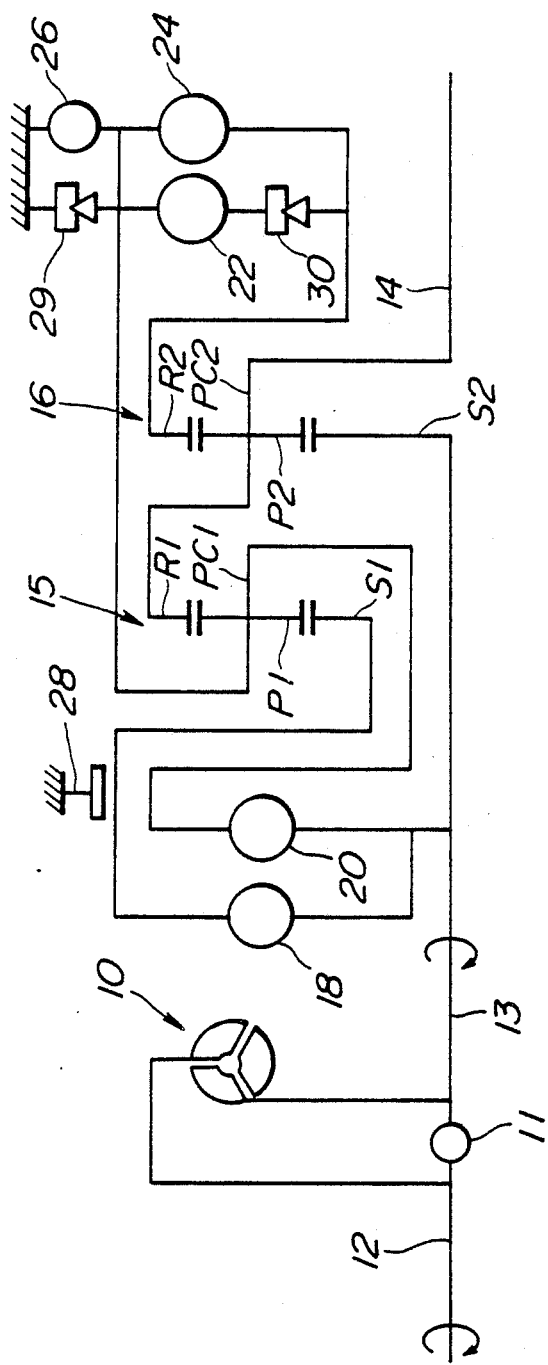
FIG. 1 is a diagrammatic illustration of an automatic power transmission to which the preferred embodiment of a shifting control system, according to the present invention, is applicable.

Referring now to the drawings, particularly to FIG. 1, there is shown an automatic power transmission having a power train of four forward speed ratios and one reverse speed ratio. The power transmission mechanism includes an input or turbine shaft 13 connected to an output shaft 12 of an automotive internal combustion engine, which serves as a prime mover via a torque converter 10. The power transmission mechanism also includes an output shaft 14 for finally transmitting driving torque to the drive means of the vehicle. The torque converter 10 has a pump impeller, a turbine runner and a stator. The pump impeller is connected to the engine output shaft, while the turbine runner is connected to the input shaft 13. The pump impeller is also connected to an oil pump for driving the pump impeller. Between the input shaft 13 and the output shaft 14 are connected a first planetary gear set 15, a second planetary gear set 16, a reverse clutch (R/C) 18, a high clutch (H/C) 20, a forward clutch (F/C) 22, an overrunning clutch (OR/C) 24, a low-and-reverse brake (LR/B) 26, a band brake (B/B) 28, a low one-way clutch (LO/C) 29 and forward one-way clutch (FO/C) 30. The torque converter incorporates a lock-up clutch 11. On the other hand, the first planetary gear set 15 includes a sun gear $S_1$, a ring gear $R_1$, pinions $P_1$ and a carrier $PC_1$ supporting the pinions $P_1$. The second planetary gear set 16 includes a sun gear $S_2$, a ring gear $R_2$, pinions $P_2$ and a carrier $PC_2$ supporting the pinions $P_2$.

The carrier $PC_1$ supporting the pinions $P_1$ is so designed as to be connectively associated with the input shaft 13 via a high clutch (H/C) 20. The carrier $PC_1$ is also connected to the ring gear $R_2$ of the second planetary gear set 16 via a forward clutch (F/C) 22 and a forward one-way clutch (FO/C) 30 which is coupled with the forward clutch in series, or in the alternative, via the forward clutch (F/C) 22 and a overrunning clutch (OR/C) 24 which is provided in parallel to the forward one-way clutch (FO/C) 30. The carrier $PC_1$ is adapted to be anchored by a low and reverse brake (LR/B) 26 and its reverse rotation is prevented by the low one-way clutch (LO/C) 29. The sun gear $S_1$ of the first planetary gear set 15 is so designed as to be connectively associated with the input shaft 13 via a reverse clutch (R/C) 18. The sun gear $S_2$ of the second planetary gear set 16 is constantly connected to the input shaft 13. The ring gear $R_1$ of the first planetary gear set 15 and the carrier $PC_2$ of the second planetary gear set 16 are constantly connected to the output shaft 14. The ring gear $R_1$ is integrally connected with the carrier $PC_2$ of the second planetary gear set 16. The sun gear $S_2$ of the second planetary gear set 16 is connected to the input shaft 13. The ring gear $R_2$ is connectively associated with the carrier $PC_1$ via the overrunning clutch (OR/C) 24. In order to establish a predetermined drive relation, the forward one-way clutch (FO/C) 30 and the forward clutch (F/C) 22 are arranged between the carrier $PC_1$ and the ring gear $R_2$ of the second planetary gear set 16. Engagement of the forward clutch (F/C) 22 causes the forward one-way clutch (FO/C) 30 to connect the ring gear $R_2$ with the carrier $PC_1$ in the reverse rotational direction.

A low and reverse brake (LR/B) 26 can fix the carrier $PC_1$. On the other hand, a band brake (B/B) 28 can fix the sun gear $S_1$. A low one-way clutch (LO/C) 29 permits rotation of the carrier $PC_1$ in a forward direction (the same direction as the rotating direction of the engine output shaft 12) and prevents the carrier $PC_1$ from rotating in reverse direction (a rotational direction opposite the forward direction).

The power transmission mode of the power train as set forth above is selected by a combination of the states of one or more friction elements, i.e. the reverse clutch (R/C) 18, the high clutch (H/C) 20, the forward clutch 22 (F/C), the overrunning clutch (OR/C) 24, the low and reverse brake (LR/B) 26 and the band brake (B/B) 28, to establish various modes of operation of the components of $S_1$, $S_2$, $R_1$, $R_2$, $PC_1$ and $PC_2$ of the first and second planetary gear sets 15 and 16. With various modes of operation of the components of the first and second planetary gear sets 15 and 16, the rotation speed at the output shaft 14 versus the rotation speed at the input shaft 13 is varied at various rates. Active components at respective operational modes of the transmission are illustrated by the indication 'o' in respective columns of FIG. 2. In the table of FIG. 2, $\alpha_1$ and $\alpha_2$ are the respective gear ratios of the sun gears $S_1$ and $S_2$ versus the ring gears $R_1$ and $R_2$. By combination of the gear ratios $\alpha_1$ and $\alpha_2$, the ratio of rotation of the output shaft 14 versus the rotation speed of the input shaft 13 is determined.

Figure 3:
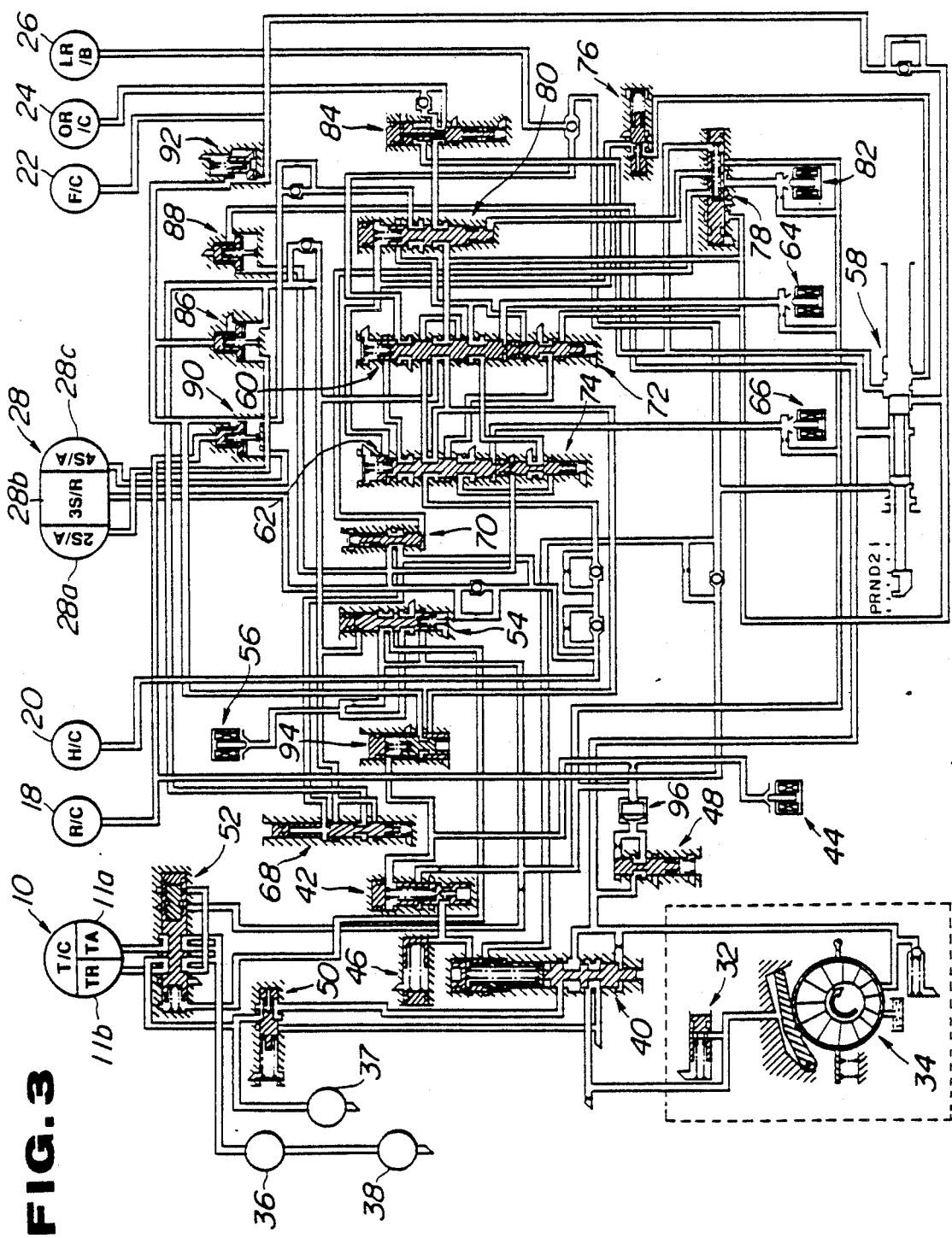
FIG. 3 is a circuit diagram of the hydraulic system of the automatic power transmission of FIG. 1.

The hydraulic system of the shown automatic power transmission, as shown in FIG. 3, provides hydraulic pressure controlling operations for respective friction elements. The hydraulic system includes a pressure regulator valve 40, a pressure modifier valve 42, a line pressure solenoid 44, a modifier pressure accumulator 46, a pilot valve 48, a torque converter release valve 50, a lock-up control valve 52, a first shuttle valve 54, a lock-up solenoid 56, a manual selector valve 58, a first shift valve 60, a second shift valve 62, a first shift solenoid 64, a second shift solenoid 66, a servo charger valve 68, a 3-2 timing valve 70, a 4-2 release valve 72, a 4-2 sequence valve 74, a first range pressure reduction valve 76, a second shuttle valve 78, an overrunning clutch control valve 80, an overrunning clutch solenoid 82, an overrunning clutch pressure reduction valve 84, a second speed ratio servo applied pressure accumulator 86, a third speed ratio servo release pressure accumulator 88, a fourth speed ratio servo applied pressure accumulator 90, N-D accumulator 92, an accumulator control valve 94 and a strainer 96.

The pressure regulator valve 40 adjusts a line pressure by modulating the source pressure from the oil pump depending upon driving conditions. The pressure modifier valve 42 serves to assist the pressure regulator valve 40 to adjust signal pressure (the modifier pressure for providing line adjusting pressure depending upon driving conditions). The modifier accumulator valve 46 removes pulsation from line pressure by smoothing the pressure modifier pressure supplied from the pressure modifier valve 42. The pilot valve 48 produces a pilot pressure for controlling line pressure, lock-up of the torque converter, the overrunning clutch, the 3-2 timing valve and so forth. The accumulator control valve 94 controls back pressure according to driving conditions. The manual selector valve 58 is associated with a manually operable selector lever and is shiftable according to selector lever position for selectively distributing line pressure for the corresponding friction elements set forth above. The first and second shift valves 60 and 62 are associated with the first shift solenoid 64 for simultaneously switching connection of three lines for controlling shifting operation between first, second, third and fourth speed ratios. The second shuttle valve 38 selectively provides pressure for the 3-2 timing control and the overrunning clutch control depending upon accelerator position. Furthermore, the second shuttle valve further disables the overrunning clutch for prevention of interlocking at a fourth speed ratio while a throttle valve open angle is large. The overrunning clutch control valve 80 serves for switching lines in order to prevent the overrunning clutch from being activated while the band brake is active at the fourth speed ratio. The 4-2 relay valve 72 stores the state of driving at the fourth speed ratio and cooperates with the 4-2 sequence valve and the first and second shift valves for preventing a change from the fourth speed ratio to the third speed ratio upon 4-2 down-shifting. The 4-2 sequence valve 74 prevents the band servo pressure from being drained during the 4-2 shifting operation until the high clutch operating pressure and the band servo release pressure are drained. The servo charger valve 68 is active at the third and fourth speed ratios for supplying a band servo operating pressure for the second speed ratio for enabling 4-2 and 3-2 down-shifting. The 3-2 timing valve 70 temporarily provides a neutral state for providing a delay for draining of the band servo release upon 3-2 down-shifting when the vehicular speed is higher than a predetermined speed. The overrunning clutch reducing valve 84 reduces operating pressure for the overrunning clutch for reducing shock at initiation of engine braking. The torque converter release valve 50 prevents the torque converter pressure from becoming excessive. The lock-up control valve 52 controls a lock-up activated state and a deactivated state for providing a smooth transition. The first shuttle valve 54 switches lines for controlling lock-up control pressure at the second, third and fourth speed ratios.

In the shown construction, an apply chamber 11a and a release chamber 11b are defined in the torque converter 10 in order to control the state of the lock-up clutch 11. Namely, when the fluid pressure is supplied to the release chamber 11b, the lock-up clutch 11 is released and when the fluid pressure is supplied to the apply chamber 11a, lock-up clutch 11 is engaged for establishing a lock-up condition. The band brake (B/B) 28 defines a second speed servo apply chamber 28a, a third speed servo release chamber 28b and a fourth speed servo apply chamber 28c. With this construction, when second speed pressure is supplied to the second speed servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

In addition to the components set forth above, the shown embodiment of the hydraulic circuit of the automatic power transmission incorporates a variable displacement vane-type oil pump 34 associated with a feedback accumulator 32. The hydraulic circuit further comprises an oil cooler 36, a front lubricant line 37 and a rear lubricant line 38.

Further details of the hydraulic system of the shown embodiment of the automatic power transmission will be appreciated from the description given in U.S. Pat. No. 4,680,992, issued on July 21, 1987, to Hayasaki et al. and from "Nissan Full-Range Electronically Controlled Automatic Transmission Service Manual", published by Nissan Motor Co., Ltd., on March, 1987. The disclosure of the above-identified publications are herein in incorporated for the sake of disclosure. Furthermore, Japanese Patent First (unexamined) Publication (Tokkai) Showa 62-62047 also discloses a hydraulic circuit similar to that illustrated in FIG. 3. The disclosure of this Japanese publication is also herein incorporated by reference for the sake of disclosure.

Figure 4:
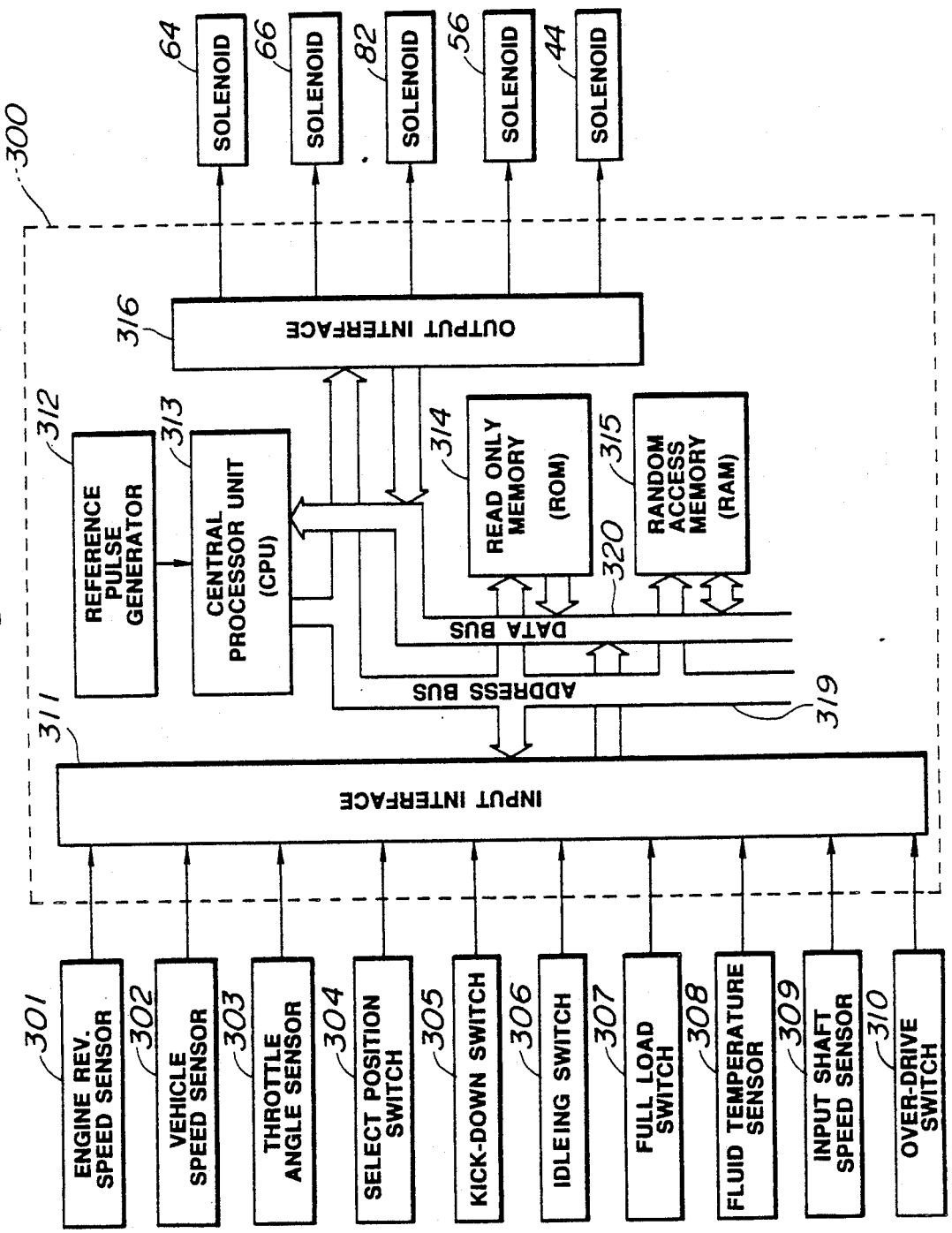
FIG. 4 is a block diagram of the preferred embodiment of a shifting control system according to the present invention.

FIG. 4 is a block diagram of control unit 300 employed in the preferred embodiment of the transmission control system according to the present invention. The control unit 300 is composed of a microprocessor-based data processing system. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature switch 308, an input shaft speed sensor 309, an over-drive switch 310, and a brake switch 322 and a parking brake switch (not shown) are connected to the input interface 311 of the control unit 300.

The engine speed sensor 301 may comprise a crank angle sensor monitoring crankshaft angular position to produce a crank reference signal at every predetermined angular position of the crankshaft and a crank position signal at every predetermined angular displacement of the crankshaft. The engine speed sensor 301 may further comprise an engine speed counter adding the crank reference signals over a predetermined period for deriving engine revolution speed to output an engine speed indicative signal N. The vehicle speed sensor 302, which is of a per se well known construction, produces a vehicle speed indicative signal V.

The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector lever position and produce a selector position indicative signal SEL representative of a selected position. The kick-down switch 305 is associated with an accelerator pedal to detect depression magnitude of the accelerator pedal greater than a predetermined magnitude to produce a kick-down command indicative signal.

The idle switch 306 is designed for detecting a fully closed position of the throttle valve to produce an engine idling condition indicative signal. The full load switch 307 is provided for detecting a fully open position of the throttle valve to produce an full load condition indicative signal. The fluid temperature sensor 308 monitors the temperature of lubricant in the transmission to produce a fluid temperature indicative signal. The input shaft speed sensor 309 monitors the rotation speed of the transmission input shaft 13 to produce an input shaft speed indicative signal. The over-drive switch 310 is associated with the selector lever for manual selection of the fourth speed ratio (overdrive) enabling or inhibiting state and produces an over-drive enable indicative signal when enabled. The brake switch (not specifically shown) is associated with a vehicular brake pedal for detecting application of the brake for producing a braking state indicative signal. Similarly, the parking brake switch (not specifically shown) detects the status of the parking brake to produce a parking brake applied state indicative signal.

The sensors, detectors and switches set forth above provide information necessary for performing transmission shifting control. Practical process for transmission shifting control have been disclosed in the aforementioned "Nissan Full-Range Electronically Controlled Automatic Transmission RE4R01A Service Manual", previously incorporated by reference.

The control unit 300 is so programmed as to process various shifting control parameter signals provided from the sensors, detector switches and so forth for selecting the appropriate transmission speed ratio. Among various shifting control operations, the control unit 300 performs control for adjusting down-shift timing in response to a manually entered command for down-shifting, particularly for obtaining engine braking effect for decelerating the vehicle. As will be appreciated, the down shift command is normally entered by operating a manually operable selector to a lower speed ratio range. In general, the timing of down-shifting of the transmission speed ratio is determined in terms of vehicle speed and the throttle valve angular position in relation to down-shifting criterion. Therefore, down-shifting criterion are set respective of transmission speed ratio ranges so that down-shifting operation according to a command for shifting the transmission speed ratio to a lower speed ratio is carried out when the vehicle speed drops across the down-shifting criterion.

According to the present invention, first and second down-shifting criteria are set for determining the down-shift timing of the transmission speed ratio, which first down-shifting criterion is set at a vehicle speed higher than that of the second down-shifting criterion. The first and second down-shifting criteria for each of the transmission speed ratio ranges are set in the ROM 314 in the control unit 300. Therefore, the CPU 313 selects one of the first and second down-shifting criteria corresponding to the currently selected transmission speed ratio according to a predetermined criteria selecting schedule. According to the preferred embodiment, the CPU 313 initially selects the first down-shifting criterion in response to entry of the down-shift command and maintains the first down-shifting criterion for a predetermined period of time, and subsequently, after expiration of the predetermined time period, the second down-shifting criterion is selected. The process of selecting one of the first and second down-shifting criteria will be discussed in detail with reference to FIG. 5.

Figure 5:
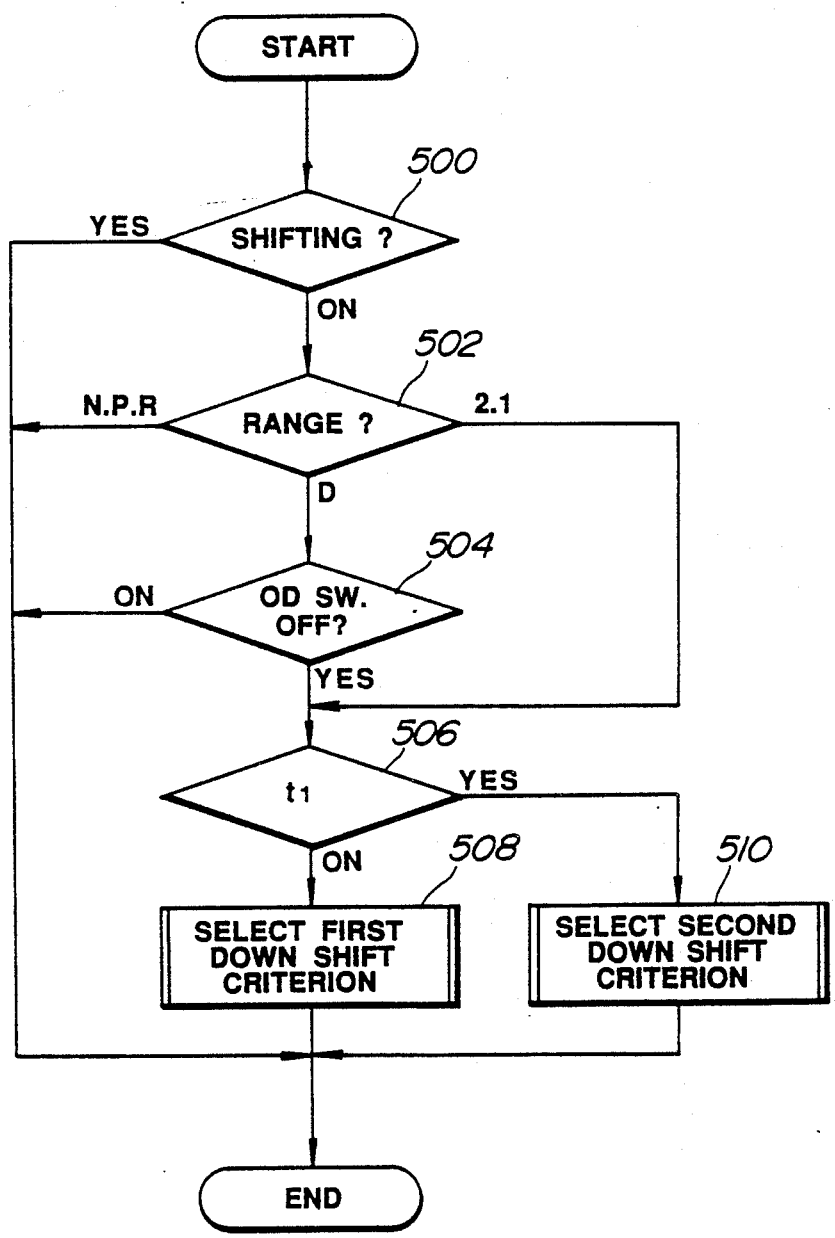
FIG. 5 is a flowchart of a routine for selecting down-shifting criteria for controlling down-shift timing, to be triggered in response to a down-shift command.

The routine illustrated in FIG. 5 is triggered at predetermined timings. At the initial step after starting execution, a check is performed whether the automatic power transmission is in a state of shifting transition, in which the transmission speed ratio is varied from one speed ratio to another speed ratio, at a step 500. When the transmission is in the shifting transition state as checked at the step 500, the process directly goes to an END. On the other hand, if the transmission as checked at the step 500 is not in the shifting transition state, the current transmission selector range is checked at a step 502. When the selected operational range of the automatic power transmission, as checked at the step 502, is a P (parking) range, an R (reverse) range or an N (neutral) range, the process again goes to an END directly. On the other hand, if the selected operational range is a D (drive) range for automatic shifting over various speed ratios, a check is performed whether an over-drive switch 310 is in OFF position, at a step 504. When the over-drive switch 310 as checked at the step 504 is held ON, the process directly goes to an END.

On the other hand, if the selected operational range as checked at the step 502 is a 1 (first hold) range or a 2 (second hold) range, the process skips the step 504. The answer at the step 504 will be affirmative because of the OFF position of the over-drive switch 310 if the selected operational range is the 1 range or the 2 range. At a step 506 a timer, which is triggered to start measurement of elapsed time upon entry of a down-shift command such as cancellation or turning OFF of the over-drive switch 310, or shifting of the selector to a lower speed ratio range, measures a timer value t. When the timer value t is smaller than or equal to a timer threshold $t_1$, the first down-shifting criterion is selected at a step 508. On the other hand, when the timer value t is greater than the timer threshold $t_1$, then, the second down-shifting criterion is selected at a step 510.

Figure 6:
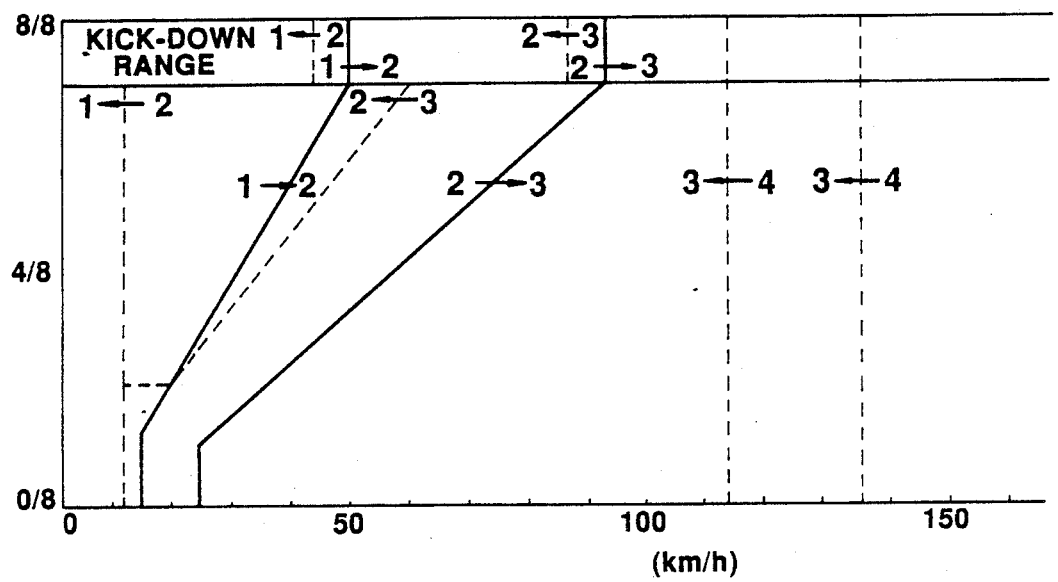
FIGS. 6 through 8 are charts showing down-shifting criteria relative to throttle valve angular position and vehicle speed at respective speed ratio ranges.
Figure 7:
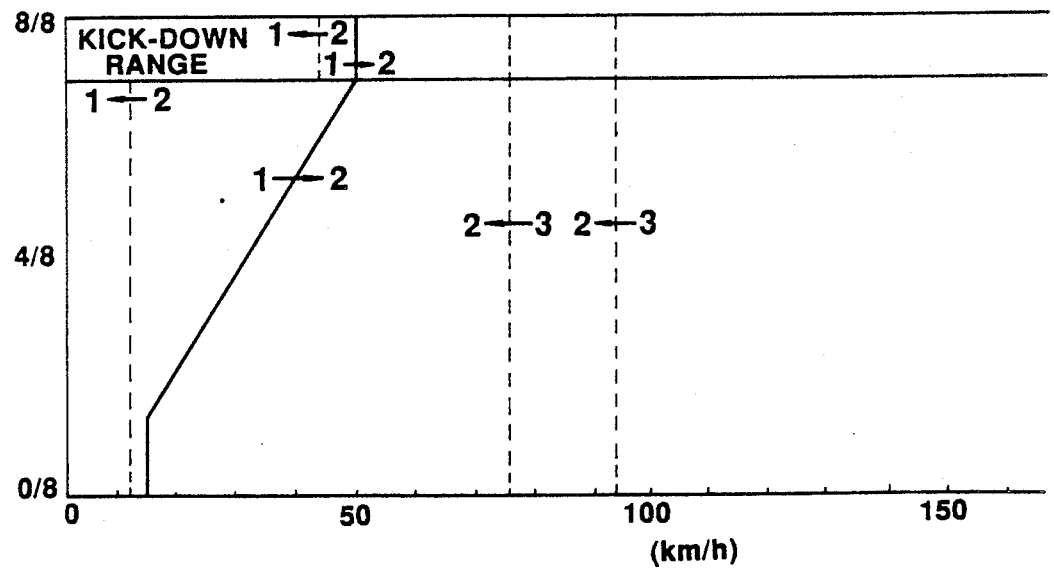
Figure 8:
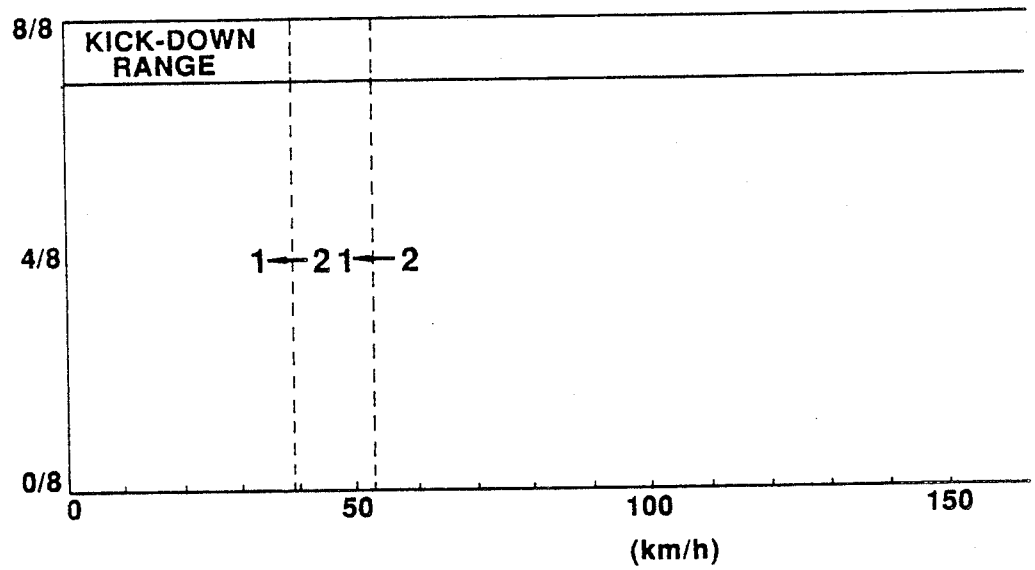

FIGS. 6 through 8 show down-shifting criteria practically set in the shown embodiment of the shift control system for the automatic power transmission according to the present invention. FIG. 6 shows 1-2 down-shifting criteria, 2-3 down-shifting criteria and 3-4 down-shifting criteria in the D range. On the other hand, FIG. 7 shows 1-2 down-shifting criteria and 2-3 down-shifting criteria in the 2 range. Furthermore, FIG. 8 shows 1-2 down-shifting criteria in the 1 range.

In FIG. 6, 4-3 down-shifting to vary the speed ratio from fourth (over-drive) speed ratio to the third speed ratio is performed in response to cancellation of the over-drive switch 310. Practically, the first 4-3 down-shifting criterion is set at 136 km/h irrespective of the throttle valve angular position so that the fourth speed ratio is maintained as long as the vehicle speed is maintained higher than 136 km/h and the speed ratio is varied into the third speed ratio when the vehicle speed drops across 136 km/h. The first 4-3 down-shifting criterion is set so that the engine revolution speed becomes an allowable maximum speed when 4-3 down shifting is initiated at the corresponding vehicle speed. The second 4-3 down-shifting criterion is set at 114 km/h. On the other hand, as can be seen from FIG. 6, at the D range, 3-2 down-shifting criterion is variable depending upon the throttle valve angular position so that 3-2 down shifting is performed at a higher vehicle speed the greater the throttle valve opening angle. Also, in the D range, the first 2-1 down-shifting criterion varies according to variation of the vehicle speed and of the throttle valve angular position, and the second 2-1 down-shifting criterion is held constant irrespective of the vehicle speed and the throttle valve angular position.

In FIG. 7, the first 3-2 down-shifting criterion is practically set at a vehicle speed of 93 km/h, and the second 3-2 down-shifting criterion is set at a vehicle speed of 76 km/h. Also, as shown in FIG. 8, the first 2-1 down-shifting criterion is set at a vehicle speed of 53 km/h and the second 2-1 down-shifting criterion is set at a vehicle speed of 39 km/h. The first down-shifting criteria for 3-2 down-shifting and 2-1 down-shifting are also determined so that the engine revolution speed is increased to the allowable maximum speed.

Such strategy in the selection of the down-shifting criteria is advantageous for adjusting the timing of actual down-shifting operations because it can successfully avoid overrunning of the engine when the vehicle speed is far higher than the down-shifting criterion and can provide higher response characteristics to a down-shift command when vehicle speed is not so high in relation to the down-shifting criterion (first down-shifting criterion). For example, assuming the vehicle is driven at the third speed ratio with the selector set in the D range, the first 3-2 down-shifting criterion (93 km/h) is initially selected in response to shifting of the selector into the 2 range. If the vehicle speed upon shifting of selector into the 2 range is lower than or equal to the first 3-2 down-shifting criterion, 3-2 down-shifting operation is instantly initiated with substantially no delay time. At this moment, since the first 3-2 down-shifting criterion (93 km/h) is set so that the engine revolution speed at the second speed ratio may not exceed the allowable maximum engine revolution speed, overrunning of the engine is never caused. On the other hand, if the vehicle speed is close to, but higher than, the first 3-2 down-shifting criterion so that the vehicle speed can be dropped within the predetermined period $t_1$, 3-2 down-shifting is performed when the vehicle speed drops across the first 3-2 down-shifting criterion. Furthermore, when the vehicle speed is far higher than the first 3-2 down-shifting criterion so that it requires a longer period than the predetermined time period $t_1$ to decelerate to the threshold of the first 3-2 down-shifting criterion, the second 3-2 shifting criterion (76 km/h) is selected upon expiration of the predertermined period $t_1$. Therefore, down-shifting is actually caused when the vehicle speed drops across the second 3-2 down-shifting criterion. This is advantageous in view of vehicle driving stability.

For instance, as in the prior proposals, it is possible to set the down-shifting criterion at the vehicle speed corresponding to the first down-shifting criterion of the present invention. In such case, the engine revolution speed is increased to the allowable maximum speed whenever the down-shift command is entered at a vehicle speed higher than the down-shifting criterion. Particularly, when the vehicle speed is far higher than the down-shifting criterion, the engine revolution speed is increased rapidly toward the allowable maximum speed at timing unknown to the driver. Such rapid increase of the engine revolution speed with substantial magnitude of delay time may shock the driver and degrade the feel, or comfort of driving the vehicle. Furthermore, 3-2 down-shifting at a timing unknown to the driver may provide a substantial or excessive magnitude of engine braking effect also lowering vehicle driving stability.

In contrast to the above, according to the preferred process of shift control, since the second down-shifting criterion is used when the vehicle speed is higher than the first down-shifting criterion in the extent that it requires a longer period to decelerate the vehicle across the first down-shifting criterion than the predetermined period, actual down-shifting will cause an increase in engine revolution. In such case, the accelerated engine revolution speed can be held lower than the allowable maximum engine speed. This clearly reduces shock to the driver and also reduces degradation of driving stability.

Though the foregoing discussion has been concentrated on shift timing for 3-2 down-shifting, substantially the same operation and advantages can be achieved for down-shifting from any range.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment selects the first down-shifting criterion at every occurrence of an entry of the down-shift command, it is possible to select the first down-shifting criterion in response to the down-shift command only when the throttle valve is fully closed or at an angular position near the fully closed position. By introducing this strategy, another type of engine overrunning can be successfully avoided. Namely, when the driving torque of the engine is transmitted to the gear train via the torque converter, the rotation speed at the turbine runner is held higher than the engine revolution speed. On the other hand, during an engine braking state, the engine revolution speed becomes higher than the rotation speed of the turbine runner by the effect of the torque converter. This tends to result in overrunning of the engine if the first down-shifting criterion is used. By permitting selection of the first down-shifting criterion, only when the throttle valve is substantially closed, this type of overrunning can be successfully avoided. Furthermore, the predetermined period $t_1$ need not necessarily be a fixed value but can be made variable depending upon the current operational range of the automatic power transmission or current vehicle driving conditions.

As can be appreciated, the present invention fulfills all of the objects and advantages sought therefor.

What is claimed is:

1. A shift control system for an automatic power transmission for an automotive vehicle, the automatic transmission being shiftable between a plurality of speed ratios and having a plurality of operational ranges, comprising:

manually operable first means for generating a down-shift command indicative signal;

second means for detecting a vehicle speed representative data of the vehicle and generating a vehicle speed;

third means for comparing a selected one of first and second down-shifting criteria with said vehicle speed indicative signal and determining an optimum shift timing after said down-shift command indicative signal has been generated, said first down-shifting criterion being set at a value corresponding to a higher vehicle speed than that of said second down-shifting criterion, said third means being operative to keep selecting said first down-shifting criterion for a predetermined period of time after said down-shift command indicative signal has been generated and subsequently selecting said second down-shifting criterion after expiration of said predetermined time period.

2. A shift control system as set forth in claim 1, wherein said first down-shifting criterion is set at a vehicle speed at which engine braking effect causes an increase in engine speed of an automotive internal combustion engine within an allowable maximum speed.

3. A shift control system as set forth in claim 1, wherein said first and second down-shifting criteria are set with respect to each of the plurality of operational ranges of said automatic power transmission.

4. A shift control system as set forth in claim 1, which further comprises fourth means for generating an engine idling indicative data, and wherein said third means is responsive to said down-shift command indicative signal for selecting said first down-shifting criterion when said engine idling indicative signal is generated.

5. A shift control system for an automatic power transmission for an automotive vehicle, the automatic transmission being shiftable between a plurality of speed ratios, comprising:

manually operable first means for generating a down-shift command indicative signal;

second means for detecting a vehicle speed of the vehicle and generating a vehicle speed indicative signal indicative of said vehicle speed detected;

third means responsive to said down-shift command indicative signal for comparing said vehicle speed indicative signal with a first predetermined vehicle speed for a predetermined period of time after said generation of said down-shift command indicative signal and effecting a down-shift corresponding to said down-shift command indicative signal when said vehicle speed indicative signal is lower than said first predetermined vehicle speed, and comparing said vehicle speed indicative signal with a second predetermined vehicle speed upon expiration of said predetermined period of time and effecting said down-shift when said vehicle speed indicative signal is lower than said second predetermined vehicle speed, whereby said down-shift is effected immediately after generation of said down-shift command indicative signal when the vehicle speed is lower than said first predetermined vehicle speed even if it is higher than said second predetermined vehicle speed.

* * * * *